J. W. LOVERING.
HATCHET ATTACHMENT FOR HAMMERS.
APPLICATION FILED DEC. 21, 1912.
1,180,405.                                                                         Patented Apr. 25, 1916.
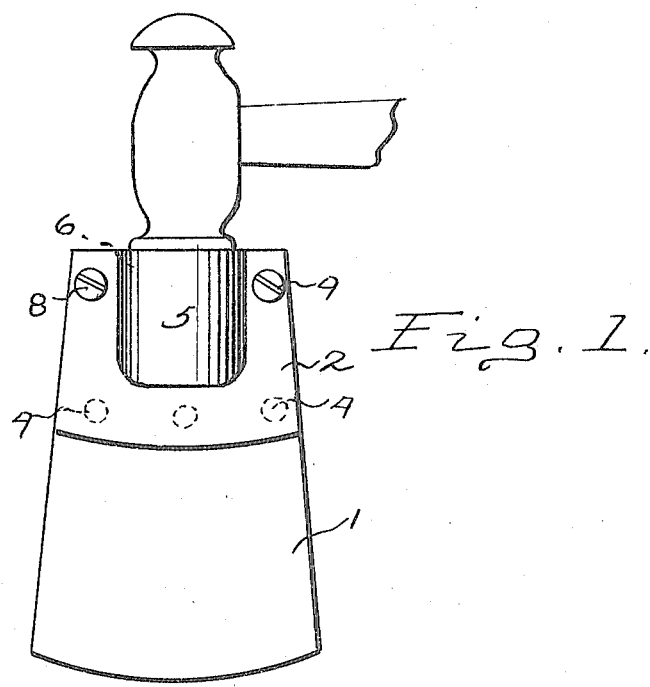
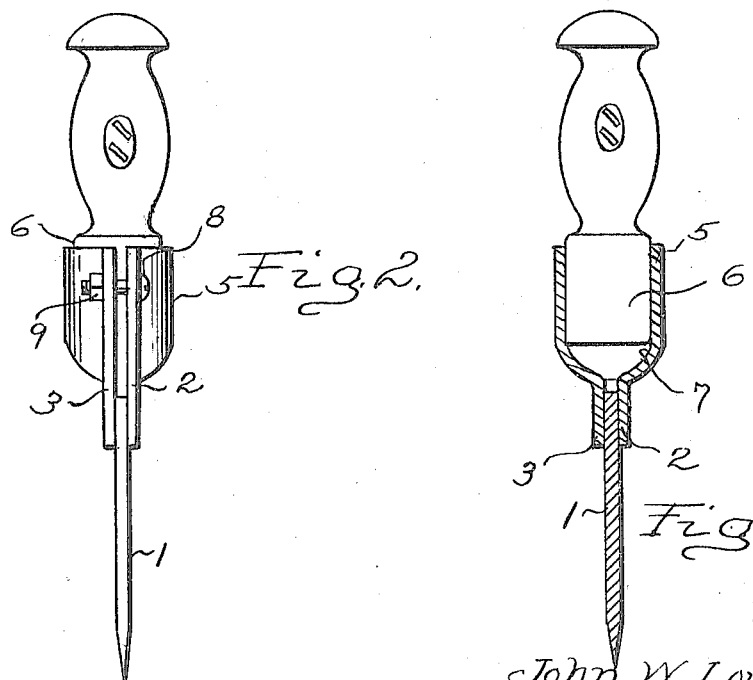

UNITED STATES PATENT OFFICE.

JOHN W. LOVERING, OF SANDOWN, NEW HAMPSHIRE.

HATCHET ATTACHMENT FOR HAMMERS.

1,180,405.  Specification of Letters Patent.  Patented Apr. 25, 1916.

Application filed December 21, 1912. Serial No. 738,093.

*To all whom it may concern:*

Be it known that I, JOHN W. LOVERING, a citizen of the United States, residing at Sandown, in the county of Rockingham and State of New Hampshire, have invented certain new and useful Improvements in Hatchet Attachments for Hammers, of which the following is a specification.

This invention comprehends certain improvements in hammer attachments and relates more particularly to a hatchet attachment for hammers, said attachment being removably secured to the head of a hammer.

The primary object of the invention resides in the provision of an attachment of this nature, which shall be of extremely simple construction, cheap to manufacture, easily applied, and easily removed.

A more specific object of the invention resides in the provision of an attachment comprising a blade having spring-metal plates secured adjacent the upper edge of the blade on opposite sides thereof, said plates being formed with centrally positioned offset portions to engage the hammer head.

This invention is an improvement on the device of my Patent No. 1056920 issued to me March 25, 1913 for improvement in tools. The device of said patent was found to be impractical and difficult to manufacture and much more expensive than that of the present invention. In the manufacture of the device of said patent it was found extremely difficult to weld a steel edge or blade to the body portion of the tool, owing probably to the large extent of surface exposed during the process of electric welding. The present invention, however, overcomes the objectionable features of the previous device and is much more practicable and much less expensive to manufacture, the practicability in the manufacture of the present device being due in part to the fact that the welding takes place at a point considerably removed from the cutting edge of the blade thereby obviating any objectionable effect on the cutting edge during the welding process and to the fact that the blade is seated between the two plates which are arranged in substantially parallel relation and thereby enabling a much better weld to be made.

The invention also aims to generally improve devices of this nature to render them more efficient, useful, and commercially desirable.

With these and other objects in view, as will become more apparent as the description proceeds, the invention consists in certain novel features of construction, combination, and arrangement of parts, as will be hereinafter more fully described and claimed.

For a complete understanding of my invention, reference is to be had to the following description and accompanying drawings, in which, Figure 1 is a side elevation of my invention applied to a hammer, Fig. 2 is an edge elevation of the same, and, Fig. 3 is a longitudinal sectional view of my invention, showing the same applied to a hammer.

Referring to the drawings by numerals, 1 designates a blade, adjacent the upper edge of which the spring-metal plates 2 and 3 are secured by means of the electric welds 4. The plates are disposed parallel to each other on opposite sides of the blade 1 and are formed with the centrally positioned offset portions 5, which form in conjunction with one another, a pocket to receive the head 6 of a hammer or other tool. The offset portions 5 are formed adjacent the free edges of the plates 2 and 3, intermediate the ends of said edges, and extend inwardly for a considerable distance and terminate in the shoulders 7. To lock the plates 2 and 3 positively upon the head 6, I provide the screw bolts 8 and nuts 9, said bolts extending through registering openings formed in the plates adjacent their free edges. When the nuts 9 are loosened upon the bolts, the spring-metal plates 2 and 3, because of this resiliency, may be easily sprung apart to permit of the removal of the head 6. The same is also true when the head is being positioned within the pocket formed by the off-set portions 5.

From the foregoing description and accompanying drawings, it will be seen that I have provided an extremely simple hatchet attachment, which may be easily and quickly applied to hammers or similar tools. The device may also be attached to a pole for use in cutting limbs from trees, it may also be used for cutting holes in ice, to scrape hard ice from side-walks, etc.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

A hatchet attachment for hammers comprising a pair of plates having cup portions formed therein to fit the head of a hammer, the side edges of said plates projecting laterally of said cup portions, means for detachably connecting said portions upon a hammer head, and a cutting blade seated between and welded to the portions of said plates lapping said blade below said cup portions.

In testimony whereof I affix my signature in presence of two witnesses.

JOHN W. LOVERING.

Witnesses:
JESSE B. PATTEE,
A. F. BISSEN.

Copies of this patent may be obtained for five cents each, by addressing the "Commissioner of Patents, Washington, D. C."